Figures 1, 2:
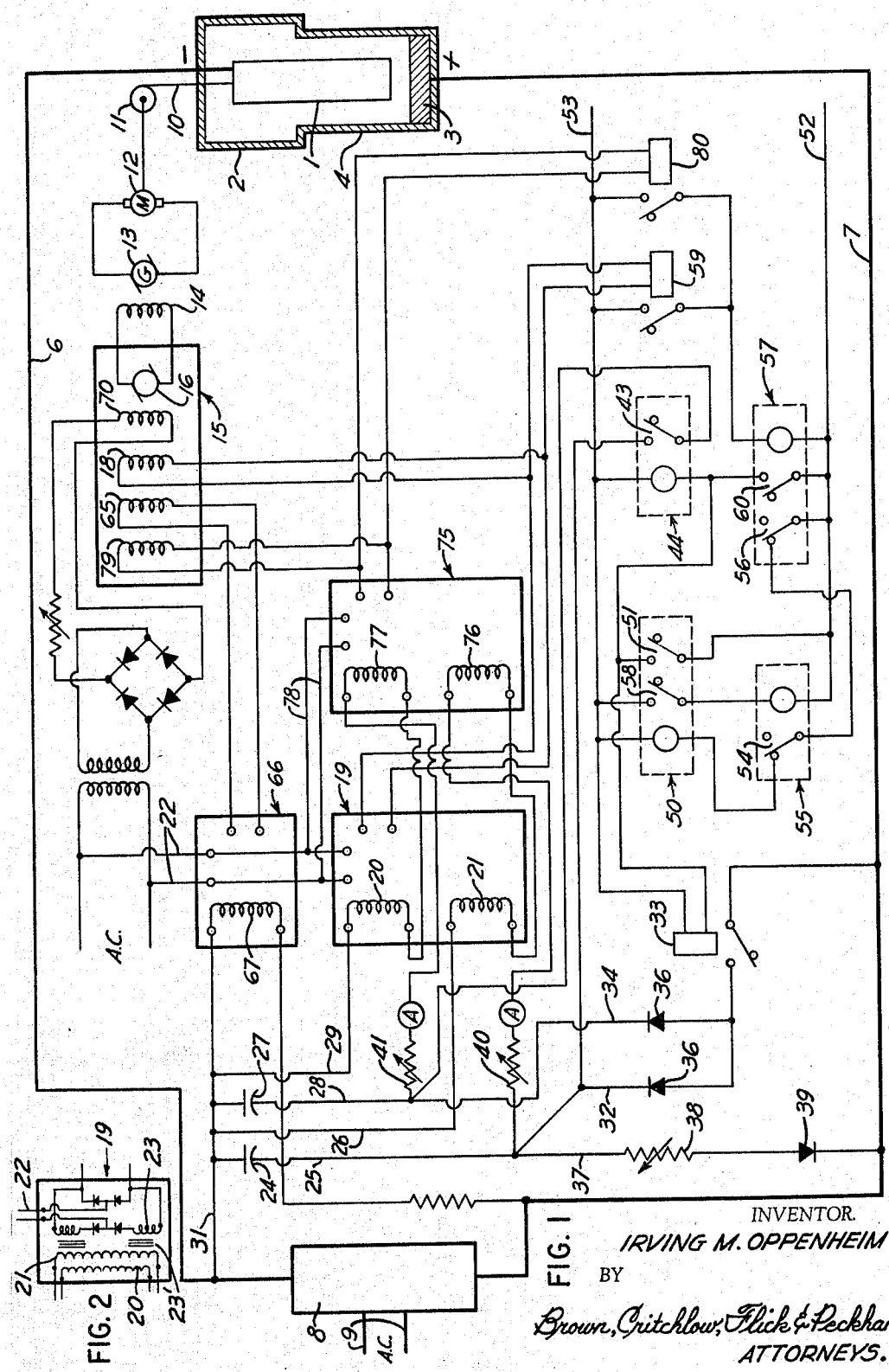

Oct. 4, 1966  I. M. OPPENHEIM  3,277,229
ARC LENGTH REGULATOR FOR CONSUMABLE ELECTRODE MELTING
Filed Nov. 15, 1963

INVENTOR.
IRVING M. OPPENHEIM
BY
Brown, Critchlow, Flick & Peckham.
ATTORNEYS.

United States Patent Office 3,277,229
Patented Oct. 4, 1966

3,277,229
ARC LENGTH REGULATOR FOR CONSUMABLE ELECTRODE MELTING
Irving M. Oppenheim, Pittsburgh, Pa., assignor to Universal-Cyclops Steel Corporation, Bridgeville, Pa., a corporation of Pennsylvania
Filed Nov. 15, 1963, Ser. No. 323,987
13 Claims. (Cl. 13—13)

This invention relates to consumable electrode melting, and more particularly to means for regulating the length of the electric arc between a consumable electrode and the pool of molten metal melted from it.

In order to produce ingots of good quality by a consumable electrode melting process, it is necessary to regulate or control the length of the arc where the melting occurs. For high quality ingots there is an optimum or normal arc length for each kind of material being melted, the size of the electrode, the melting power and other factors. It will be seen that if the electrode remains stationary, the length of the arc will increase as the lower end of the electrode melts and the molten metal falls into the pool below it. Therefore, it is necessary to drive down or lower the electrode as melting progresses in order to maintain the length of the arc as constant as possible. However, if the electrode is driven down too rapidly, the arc will be shortened and a complete short circuit may even occur.

For regulating the length of the arc in a consumable electrode furnace there are several types of regulating systems available. The one most commonly used employs a voltage regulator, the main advantage of which is that the feedback signal is easily obtained. However, there are many disadvantages. The foremost of these is that changes in voltage occur without changes in arc length, thereby producing undesired operation of the electrode driving mechanism. Furthermore, the voltage gradient in the arc varies with the material being melted, the size of the electrode, the melting power, etc., so that a unit change in voltage for one condition will indicate one change in arc length, but for another material it will indicate an entirely different change in arc length.

Another type of regulator is one that feeds the electrode down at a rate slightly in excess of the difference in electrode burn-off and ingot build-up. When the electrode descends far enough to short out in the molten pool, it is driven up a predetermined distance and then starts down again. With this type of control the electrode always is moving, first down and then up, and the arc length constantly is changing. This can produce instability in the arc, which will produce ingots of poor quality.

A further regulating system is known as a drip short counter, which operates on the premise that the main objective is to prevent the length of the arc from becoming too long. Drip shorts of the range of two per minute are used, and occur when drops of molten metal from the electrode bridge the arc gap or when spattering of the molten pool causes it to meet drops of metal falling from the electrode. These drip shorts are heavy enough to be seen on an indicating meter or to operate an electromechanical relay. However, a study of arc characteristics shows that there are other more numerous voltage dips that such a control does not consider. Moreover, the counting of short circuits takes no account of the extent of the actual short circuit nor the combination of the number of shorts or near shorts that occur, nor the amount of voltage change and the duration of the change.

It is among the objects of this invention to provide an arc length regulator which will control the arc length more accurately than heretofore, which controls the arc length independently of varying furnace conditions, which takes into account the number and extent and duration of deviations from normal arc voltage, which raises or lowers the electrode only when the arc length starts to change, and which normally drives the electrode only downwardly.

The preferred embodiment of the invention is illustrated in the accompanying drawing, in which FIG. 1 is a diagram of my arc length regulating system, and FIG. 2 is a more detailed diagram of a flux balancing device.

Referring to the drawing, a consumable electrode 1 is shown suspended in an arc furnace 2 over a pool 3 of molten metal in the bottom of the furnace, which forms a mold 4. To melt the electrode, electric power is supplied to it and the molten metal below it through direct current conductors 6 and 7, respectively. These two conductors are fed from a rectifier 8, to which alternating current is supplied through conductors 9. The electric power causes an electric arc to be maintained between the lower end of the electrode and the top of the molten pool.

The electrode is suspended in the furnace by suitable raising and lowering means, such as by a cable 10 wound on a drum 11 that is operated by a reversing motor 12 through a suitable train of gears (not shown). Power for the motor is furnished by a generator 13, the field 14 of which is controlled by a multifield generator regulator 15 that can change the direction of flow of current through the field to reverse the generator and thereby reverse the motor. The regulator includes an excitor armature 16.

To energize the generator in order to drive the electrode down in the furnace, the generator regulator 15 is provided with a down-drive field coil 18 for the excitor armature, which is electrically connected to a flux balancing device 19, known as a bi-stable amplifier, that is a commercial item which can be purchased. A more complete diagrammatic view of it is shown in FIG. 2. This balancing device includes a pair of coils, referred to herein as a reference coil 20 and a regulating coil 21. As long as the magnetic flux created by the regulating coil is equal to or less than that created by the reference coil, the balancing device will maintain the down-drive coil inactive by shutting it off from the A.C. power supply that is connected to it through wires 22. This is because wires 22 are connected with the wires leading to coil 18 through a high impedance path that includes a pair of windings 23 wound on the same cores 23' as coils 20 and 21. Whenever the regulating coil flux exceeds the reference coil flux, the cores are saturated by flux and the impedance of the circuit thereby reduced so that the balancing device electrically connects wires 22 with the down-drive coil 18 which, being energized, in turn causes the generator field 14 to be energized in such a way that the generator will drive the motor to cause it to lower the electrode in the furnace.

It is a feature of this invention that the magnetic flux created by regulating coil 21 is directly related to the length of the arc in the furnace in such a way that as long as the arc is the proper length or less, the regulating coil flux will be equal to or less than the reference coil flux. On the other hand, when the arc starts to increase in length above the optimum size, the regulating coil will create more magnetic flux than the reference coil and the down-drive will operate as mentioned above.

The current that flows through the regulating and reference coils to create magnetic flux is produced by the discharge of two condensers; i.e. a regulating condenser 24 connected through wires 25 and 26 with the regulating coil, and a reference condenser 27 connected through wires 28 and 29 with the reference coil. As described later, there may be another coil in series with each of these coils. Each circuit is connected with power conductor 6 by means of a wire 31 connected with wires 26 and 29. The other side of each condenser is connected with the other power conductor 7. This is done by a wire 32 connecting wire 25 to a normally open electric relay 33 that is electrically connected to conductor 7, and by a wire 34 connecting wire 28 to wire 32. In wires 32 and 34 there are devices, such as diodes 36, that permit current to flow only in a direction from conductor 7 toward the condenser circuits. The regulating circuit also is connected to conductor 7 by another wire 37 containing a variable resistor 38 and a diode 39 that allows the current to flow only toward the conductor. Between this wire and the regulating coil 21, wire 25 contains a variable high resistance 40. It will therefore be seen that when the regulating condenser discharges after being charged, the high resistance 40 will compel most of the current to flow into the power conductor 7 through wire 37, with the remaining very small amount flowing through the regulating coil. On the other hand, the reference condenser can discharge only through the reference coil 20, at a rate determined by a variable resistor 41 in wire 28.

In order to charge the two condensers, relay 33 is closed momentarily. To make sure that both condensers receive the same charge and therefore are balanced, the normally open relay contacts 43 of a timer 44 may be connected across wires 25 and 28 of the two condenser circuits in a position between the condensers and resistors 40 and 41. By maintaining these contacts closed a moment after the other relay 33 has opened, the charges in the two condensers will balance themselves.

The means for closing relays 33 and contacts 43 will be described after the operation of the two condenser circuits has been explained. Whenever the relays are closed, the two condensers are instantly charged by conductors 6 and 7 to the voltage at the arc. Immediately upon opening of the relays, the reference condenser 27 discharges through reference coil 20 and thereby creates magnetic flux of a certain value. At the same time, the regulating condenser discharges, but since the high resistance 40 between it and the regulating coil resists the flow of current to that coil, most of it discharges through wire 37 into conductor 7 and the arc at a rate determined by the setting of resistor 38. The reason that this condenser can discharge into the arc is that, although there may be and usually is no measurable reduction in voltage at the arc below that at the condenser, there are many minute short circuits caused by drops of metal falling from the electrode. These shorts vary in number, extent and duration. Although they usually do not reduce the voltage at the arc a measurable amount, nevertheless they cause voltage dips sufficient to allow the regulating condenser to discharge into the arc.

As long as the arc has the desired length, so much current from the regulating condenser will discharge into it and so little will flow through the regulating coil that the flux of the latter will not exceed that of the reference coil and the down-drive will remain inactive. However, whenever the arc length increases, the number, extent and duration of shorts in the arc will be reduced, so the regulating condenser will not be able to discharge into it as rapidly as before. The result is that more current will then flow through the regulating coil. Since this coil is provided with many more turns than the reference coil, such as a ratio of 40 to 1 for example, it does not require much increase in current through the regulating coil to create more flux than created by the reference coil. As soon as that condition occurs, the down-drive is activated and the electrode is lowered to shorten the arc length to normal. As will be explained shortly, the condensers are charged and discharged every few seconds, so the arc length is under constant regulation.

The condenser-charging relay 33 normally is closed by a timer 50 that is adjusted to close its contacts 51 every few seconds, such as about every 10 seconds. These contacts electrically connect an A.C. conductor 52 to relay 33, which is connected directly to the other conductor 53 of the A.C. control circuit. One side of the timer is connected to conductor 53, and the other side is connected through the normally closed contacts 54 of a timer 55 and the normally closed contacts 56 of a timer 57 with conductor 52. Closing of contacts 51 also energizes timer 44, which will close its contacts 43 and hold them closed for a fraction of a second after relay 33 opens. Timer 50 also closes another set of contacts 58 that connect timer 55 in the control circuit so that contacts 54 will be opened to stop timer 50 for a few seconds. Stopping of this timer opens the circuit of timer 55 at contacts 58, and contacts 54 therefore reclose. Timer 50 recycles periodically as long as the length of the arc remains the same, but when the arc starts to increase, the down-drive coil 18 circuit is energized as explained before and closes a relay 59 that connects timer 57 in the A.C. control circuit. This timer opens contacts 56 to stop timer 50, and closes contacts 60 that in turn close the circuit to relay 33 and connect timer 44 in the control circuit to close contacts 43 so that the two condensers will be charged and balanced. The moment this occurs, the magnetic flux of coils 20 and 21 is put in balance again, and the down-drive stops.

In case the arc becomes so short that a virtual short circuit is set up in the furnace, the electrode is driven up or raised. This is accomplished with the help of an up-drive field coil 65 in generator regulator 15, which is connected with a flux balancing device or bi-stable amplifier 66 energized from A.C. wires 22. This device contains a coil 67 that is connected to both conductors of the power supply in parallel with the arc. While the length of the arc remains normal, this coil draws enough current to maintain the up-drive inactive. However, whenever the current drawn by that coil is reduced to a predetermined value, due to abnormal reduction in the length of the arc, the up-drive coil is energized and the generator and motor are reversed to raise the electrode to eliminate the short circuit condition. Raising of the electrode will cause coil 67 to draw more current again and shut off the up-drive.

With some types of electrode drive, the weight of the electrode may cause it to drift down after the down-drive has been stopped. In such cases, any possibility of such drift can be eliminated by providing the generator regulator 15 with a field coil 70 that is constantly energized to place a small amount of up-drive bias on the generator so that when down-drive 18 coil is de-energized the biased generator will hold the electrode stationary.

Under some melting conditions, such as when the electrodes may not burn off evenly enough, there may be a tendency for the arc to become too short for too long a time. To take care of such cases another flux balancing device 75 or bi-stable amplifier may be added, which will drive the electrode up very slightly whenever conditions make that desirable. This up-drive functions under conditions that are not so severe as to cause the short-circuit up-drive to operate. The balancing device 75 includes two additional coils 76 and 77, each electrically connected in series with one of the coils in flux balancing device 19, but with their polarities reversed relative to those coils. A.C. power is supplied to device 75 through wires 78 that may be connected to wires 22. The construction of device 75 can be similar to flux balancing device 19.

Balancing device 75 is adjusted so that under normal operating conditions it serves no purpose, but in case the arc starts to become too short, the magnetic flux created by coil 76 will be reduced so much in relation to the flux created by coil 77 that the balancing device will connect wires 78 with an up-drive coil 79 in field regulator 15 to cause motor 12 to raise the electrode 1 a very slight amount. The current that energizes coil 79 in this way will also close a relay 80 that will connect timer 57 into the A.C. control circuit, with the same results as when relay 59 is closed, except that in the present case recharging of condensers 24 and 27 will stop the up-drive.

I claim:

1. An arc length regulator for consumable electrode melting, comprising a mold, a consumable electrode extending down into the mold, an electric power supply connected with the electrode and mold to maintain an arc between the electrode and molten metal in the mold, normally inactive means for lowering the electrode in the mold, a reference coil, a regulating coil, flux-responsive means associated with said coils and operative thereby to activate said lowering means whenever the magnetic flux created by the regulating coil exceeds that created by the reference coil, a reference condenser in circuit with the reference coil and dischargeable therethrough, a regulating condenser in circuit with the regulating coil for discharge therethrough, discharge conducting means continuously connecting the regulating condenser circuit with said arc and designed to permit flow of current only toward the arc, means connected with said power supply for periodically charging both condensers to the voltage of the arc, and means resisting discharge of the regulating condenser through the regulating coil so that most of the discharge from the regulating condenser is through said discharge conducting means into the arc and so that the regulating coil flux normally does not exceed the reference coil flux, the current that flows from the regulating condenser through the regulating coil increasing and thereby increasing the flux of that coil above the reference coil flux whenever discharge of the regulating condenser into the arc is retarded a predetermined amount of undesirable lengthening of the arc.

2. An arc length regulator according to claim 1, including means for raising the electrode in the mold, a coil connected to said power supply in parallel with the arc so that the current drawn by said coil varies with voltage variations at the arc, and control means associated with the coil and operative thereby to maintain said raising means inactive while the arc length is normal and greater than normal and to activate said raising means when the current drawn by the coil is reduced to a predetermined vaule due to abnormal reduction in the length of the arc.

3. An arc length regulator according to claim 1, including means for holding the electrode stationary whenever said lowering means stops lowering it.

4. An arc length regulator according to claim 1, in which said condenser-charging means include means for balancing the charges at the two condensers.

5. An arc length regulator according to claim 1, in which said lowering means include an electric motor, means driven by the motor for lowering the electrode, an electric generator for driving the motor, and a generator regulator for operating the generator and containing a coil controlled by said reference coil and regulating coil.

6. An arc length regulator according to claim 1, in which a flux balancing device contains said coils and flux-responsive means.

7. An arc length regulator according to claim 1, in which said condenser-charging means include a normally open switch between said power supply and the condenser circuits, and diodes between said switch and circuits allowing flow of current only toward the condensers through the closed switch.

8. An arc length regulator according to claim 1, including a variable resistor in said discharge-conducting means to control the rate of discharge to the arc.

9. An arc length regulator according to claim 4, in which said charge-balancing means includes normally open electric contacts between the two condenser circuits, and means for holding the contacts closed a moment after the condensers have been charged from the power supply.

10. An arc length regulator according to claim 7, including a timer for periodically closing said switch.

11. An arc length regulator according to claim 7, including a timer for periodically closing said switch, and means operative when said lowering means is activated for closing said switch and stopping said timer momentarily to reset it.

12. An arc length regulator according to claim 1, including normally inactive means for raising the electrode in the mold, an additional reference coil connected in series with said first reference coil, an additional regulating coil connected in series with said regulating coil, flux-responsive means associated with said additional coils and operative thereby to activate said raising means whenever the magnetic flux created by said additional regulating coil is reduced a predetermined amount below that created by the additional reference coil, the current flowing through the additional regulating coil decreasing and thereby reducing the flux of that coil said predetermined amount whenever discharge of the regulating condenser into the arc is increased by undesirable hsortening of the arc.

13. An arc length regulator for cousumable electrode melting, comprising a mold, a consumable electrode extending down into the mold, an electric power supply connected with the electrode and mold to maintain an arc between the electrode and molten metal in the mold, means for lowering the electrode in the mold, a reference coil, a regulating coil, flux-responsive means associated with said coils and operative thereby to control said lowering means whenever the magnetic flux created by the regulating coil exceeds that created by the reference coil, a reference condenser in circuit with the reference coil and dischargeable therethrough, a regulating condenser in circuit with the regulating coil for discharge therethrough, discharge conducting means continuously connecting the regulating condenser circuit with said arc and designed to permit flow of current only toward the arc, means connected with said power supply for periodically charging both condensers to the voltage of the arc, and means resisting discharge of the regulating condenser through the regulating coil so that most of the discharge from the regulating condenser is through said discharge conducting means into the arc and so that the regulating coil flux normally does not exceed the reference coil flux, the current that flows from the regulating condenser through the regulating coil increasing and thereby increasing the flux of that coil above the reference coil flux whenever discharge of the regulating condenser into the arc is retarded a predetermined amount by undesirable lengthening of the arc.

References Cited by the Examiner

UNITED STATES PATENTS

| | | | |
|---|---|---|---|
| 2,026,943 | 1/1936 | Kennedy et al. | 314—73 |
| 2,939,065 | 5/1960 | Matulaitis | 314—69 X |

JOSEPH V. TRUHE, *Primary Examiner.*